Oct. 24, 1967    H. SÖCHTING ET AL    3,348,564
DEVICE FOR THE AUTOMATIC DRAINING OF LIQUIDS
FROM COMPRESSED-GAS SYSTEMS
Filed Dec. 13, 1965
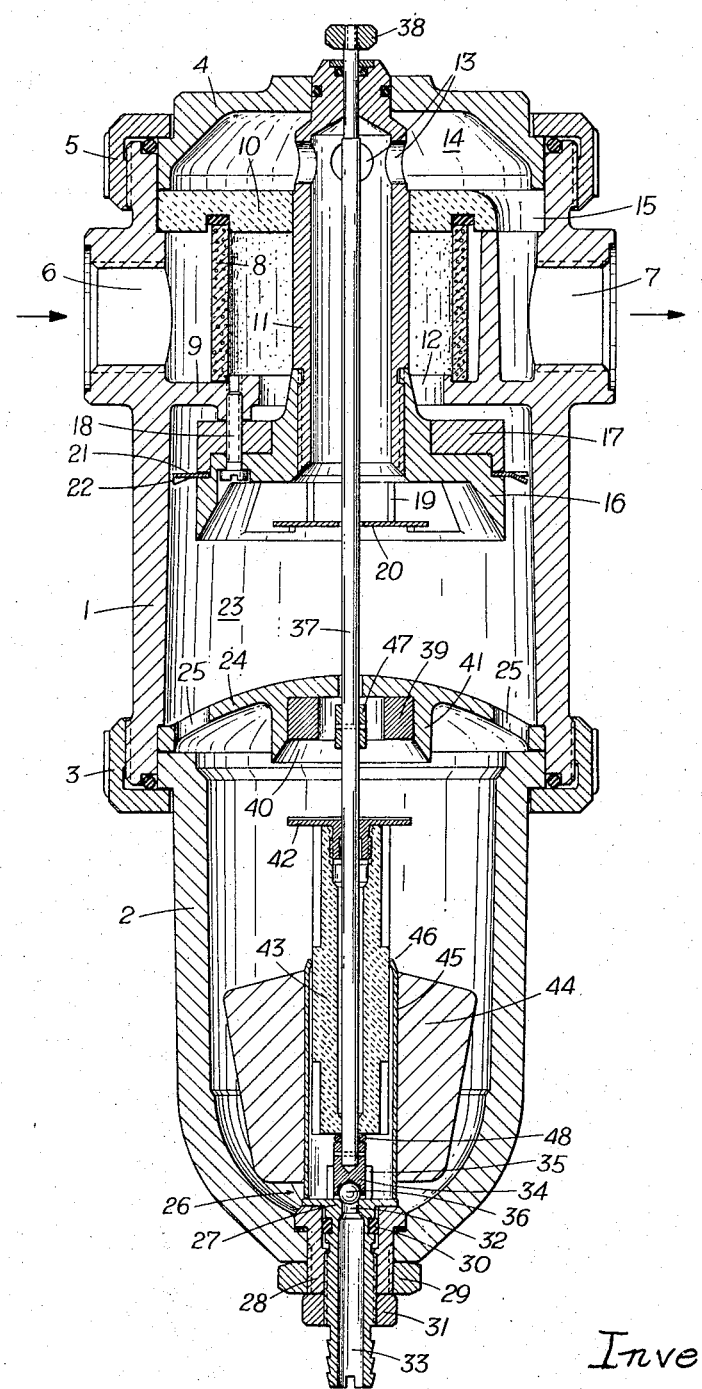
Inventors
Herbert Söchting
Erwin Vock
By Watson, Cole, Grindle + Watson
Attys.

United States Patent Office 3,348,564
Patented Oct. 24, 1967

3,348,564
DEVICE FOR THE AUTOMATIC DRAINING OF LIQUIDS FROM COMPRESSED-GAS SYSTEMS
Herbert Söchting and Erwin Vock, Vienna, Austria, assignors to Hoerbiger Ventilwerke Aktiengesellschaft, Vienna, Austria
Filed Dec. 13, 1965, Ser. No. 513,485
Claims priority, application Austria, Dec. 22, 1964, A 10,842/64
3 Claims. (Cl. 137—193)

The invention relates to a device for the automatic draining of liquids from compressed-gas systems, particularly in connection with a separator through which a stream of gas is moving under pressure.

Conventional devices of this type comprise a reservoir for accumulating the liquid separated from the compressed gas, at the lower extremity of which a drain valve with a valve seat and a closing member is provided afloat member controlling the operation of the drain valve being positioned in the interior of the said reservoir, the drain valve being directly actuated by the said float member. The liquid accumulating in the reservoir will lift the float member, causing it to open the drain valve, the liquid being discharged by the gas-pressure prevailing in the reservoir. However, these comparatively simple devices were found to be unsatisfactory because the discharge of the liquid is to slow and leakage of the drain valve is liable to occur causing objectionable losses of compressed gas.

In order to overcome these drawbacks, similar devices provide for the fast operation of the drain valve, particularly for an instantaneous and complete opening and a delayed closing motion, so as to ensure complete evacuation of the reservoir as far as possible. For the purpose, the drain valve is operated by a diaphragm to which the gas pressure prevailing inside the reservoir is supplied via an auxiliary valve controlled by the float member. However, this conventional device is relatively complicated and presents a number of openings and passages of small cross-sections liable to clogging which impairs the operational dependability of the device.

It is the object of the invention to improve upon conventional devices of this kind and to provide a device of plain design wherein the drain valve is instantaneously and completely opened when the liquid in the reservoir rises, the said drain valve being closed only as soon as the evacuation of the reservoir has been fully completed.

The invention consists in a device for the automatic draining of liquids from compressed-gas systems comprising a storage reservoir for accumulating the liquid separated from the compressed gas, a drain valve with a valve seat and a closing member at the bottom of the storage reservoir and a float inside the storage reservoir, a magnet with an armature being provided for the opening of the drain valve, the said armature co-operating with the float on the one hand and being displaceable by means of the float towards the magnet, and being in connection with the closing member of the drain valve with the interposition of a backlash on the other hand. Preferably a permanent magnet will be used for the opening of the drain valve.

The device according to the invention distinguishes itself by the simplicity of its design and by its operational dependability. Since the drain valve is operated by means of the magnet, pressurized control members, such as pistons or diaphragms and the control lines and control valves that go with them, may be dispensed with, so that there will not be any openings and pipes with small cross-sections liable to clogging as a result of the presence of impurities and foreign matter. Except for the drain valve proper, no additional sealing means are required.

For the opening of the drain valve according to the invention it is possible, for example, to adapt the weight of the float and of the armature to the lifting power of the magnet. However, according to a preferred embodiment of the invention, the armature together with the magnet are arranged in coaxial relation to the drain valve and connected with a piston on which the float is freely slideable, the said float resting in its lower end position upon the valve seat of the drain valve alongside a surface concentrically surrounding the outlet. The contact between the float and the valve seat may be tight or nearly tight. Consequently, the float resting upon the valve seat will, as the evacuation of the reservoir is nearing completion, close the passage from the lower portion of the reservoir to the still open outlet in the valve seat, thereby producing on the underside of the piston connected with the armature a pressure which is lower than the pressure prevailing on the upper side of the piston, as a result of which the piston together with the armature will be pulled away from the magnet. After having overcome the blacklash provided the armature carries the closing member of the drain valve along and presses it instantaneously and tightly against the valve seat, thereby positively closing the outlet.

Further optional features and advantages of the invention will appear from the following description of an embodiment of the invention with reference to the accompanying drawing, the single figure of which showing a vertical cross-section view of a device for the automatic draining of liquids in conjunction with a separator through which a stream of gas is flowing under pressure.

The device as illustrated comprises a separator housing 1 which may be installed in a compressed-gas piping, a reservoir 2 for the separated liquid being connected to the said separator housing and tightly screwed on to same by means of an annular cap screw 3. On the top the separator housing 1 is closed by a cover 4 also attached by means of a cap screw 5. In the shell of the separator housing 1 two connecting bores 6 and 7 are provided for the compressed-gas pipes. Inside the separator housing 1 a filter element 8 is located, consisting of a hollow cylindrical sinter body and resting with its lower extremity upon a partition 9 of the housing 1. At the upper extremity the filter element 8 is maintained in position by means of a plate 10 which is pressed against a shoulder of the housing 1 by means of the cover 4. Consequently, the filter element 8 can be easily removed from the separator housing 1 for cleaning by merely loosening the cap screw 5 after removing the cover 4 and the plate 10.

Inside the filter element 8 a through pipe 11 is installed in the separator housing 1, traversing a port 12 provided in the partition 9 and extending in an upward direction through the plate 10 and the cover 4 to the outside, its upper, closed extremity providing a cylindrical seat for the cover 4. In the shell of the through pipe 11 radial bores 13 are provided through which the interior of the pipe communicates with the chamber 14 arranged between the cover 4 and the plate 10 and communicating via an aperture 15 with the connecting bore 7. Screwed onto the lower extremity of the through pipe 11 is a funnel-shaped baffle member 16 attached to the partition 9 by means of bolts 18 with a ring 17 in between and serving also as a support for the through pipe 11. A baffle plate 20 is attached to webs 19 on the underside of the baffle member 16 on the periphery of which a flow directing plate 21 with obliquely downward bent directional vanes 22 is positioned. The portion of the separator housing 1 located beneath the baffle member 16 serves as a separator chamber 23 for the separation of the entrained liquid particles from the compressed gas.

The separator chamber 23 is located on top of the reservoir 2 which is separated from the separator chamber 23 by a cover plate 24 with a plurality of openings 25. Located on the bottom of the reservoir 2 is the drain valve 26, the valve seat 27 of which is screwed into a hollow nipple 28 attached to the bottom of the reservoir 2 by means of a nut 29. The valve seat 27 is sealed off against the nipple 28 by means of an O-ring seal 30 and is adjustable in an axial direction, being maintained in position by a lock-nut 31. Associated with the outlet 32 in the valve seat 27 which is downwardly connected with the drain passage 33 leading into the open, is a closing member 34 sliding on axial webs 35 of the valve seat 27 and carrying a ball-shaped sealing member 36 consisting for example of some soft material and attached to the closing member 34 by any convenient means such as by gluing. The closing member 34 is connected with a control rod 37 extending in an upward direction through the reservoir 2 and through the through pipe 11 in the separator housing 1 into the open, and carrying at its external extremity a control knob 38 for the manual operation of the drain valve.

For the automatic draining of the separated liquid an annular permanent magnet 39 is provided which is inserted into a pot-shaped socket 40 defined by the cover plate 24. The external sidewall 41 of the said socket protrudes over and above the magnet 39, so as to protect the same against the liquid penetrating into the reservoir 2 through the openings 25. This arrangement also precludes the risk of metal particles entrained by the liquid being deposited on the magnet 39 thereby jeopardizing the proper operation of the device. The cover plate 24 defining the socket 40 is preferably made of some non-magnetic material, such as plastics or other synthetic materials. An armature 42 made of some magnetic material co-operating with the magnet 39 is connected with a piston 43 and slideably arranged together with the said piston on the control rod 37. A float 44 is disposed on the piston 43 to permit reciprocal movement. The float is attached to a bushing 45 adapted to permit free movement of the float in relation to the piston. The upper extremity 46 of the bushing 45 is narrowed towards the piston, the reduced diameter of the bushing providing a restrictor producing a throttling effect in that place. Furthermore, the piston 43 is shouldered or laterally recessed in the area of both of its extremities, thereby providing guide webs so that the restrictor disposed at the upper extremity 46 of the bushing will produce a throttling effect in the lower travel area of the float only. This arrangement permits free reciprocal movement between the piston 43 and the float 44 in spite of the narrow clearance prevailing particularly in the area of the restrictor.

The magnet 39, the armature 42 with the piston 43 and the float 44 are arranged around the control rod 37 in coaxial relation to the drain valve 26. As appears from the drawing, the bushing 45 of the float 44 rests in its bottommost position on a flange-like enlargement of the valve seat 27 alongside a surface concentrically surrounding the outlet 32, so that in this position the liquid in the reservoir 2 is prevented from gaining access to the outlet 2. Furthermore, the float 44 co-operates with the armature 42 protruding in a radial direction over and above the bushing 45, so that when the float 44 rises, the bushing 45 abuts with its upper extremity 46 against the armature 42 and lifts the same together with the piston 43 towards the magnet 39. The armature 42 is arranged to control the closing member 34 of the drain valve 26. For the purpose, the control rod 37 is provided with a fixed stop 47 against which the armature 42 abuts during its travel on the control rod 37 after having overcome a backlash. When the drain valve 26 is closed, the piston 43 rests upon the closing member 34, an O-ring 48 being provided between the two elements for the purpose of attenuating the impact.

The device illustrated by way of example is intended for installation in a compressed-gas conduit such as for example, a compressed-air pipe for the purpose of eliminating solid impurities and liquids, particularly water, from the compressed gas flowing through the said piping. In operation, the compressed gas entering the separator through the connecting bore 6 passes through the filter element 8 into its interior, solid foreign matter being retained in the filter element 8. The compressed gas emerges through the port 12 in the partition 9, passes radially between the latter and the upper side of the ring 17, impinging upon the wall of the separator housing 1 and arrives alongside the outer surface of the ring 17 at the flow directing plate 21, a rotary movement being imparted to it by the directional vanes 22 of the said plate, and finally flows into the separator chamber 23 located underneath, wherein the liquid particles contained in the compressed gas are eliminated. From the separator chamber 23 the compressed gas then flows between the webs 19 into the through pipe 11, rising inside the same and through the bores 13 so as to reach the chamber 14 from where it passes through the aperture 15 in the plate 10 to reach the connecting bore 7 and the adjoining discharge pipe.

The liquid separated in the separator chamber 23 passes through the opening 25 on the periphery of the cover plate 24 into the interior of the reservoir 2 and accumulates on the bottom of same. As the liquid level in the reservoir 2 rises the float 44 is lifted, the bushing 45 sliding in an upward direction alongside the piston 43 until such time when its upper extremity 46 abuts against the armature 42. If the liquid level continues to rise the armature 42 together with the piston 43 is entrained by the float 44 and displaced towards the magnet 39, the armature 42 entering the magnetic field of the magnet 39, being instantaneously attracted by the magnet as soon as the same is of adequate force, abuts against the stop 47 and lifts the closing member 34 off the outlet 32 in the valve seat 27. With the help of the gas pressure prevailing in the reservoir 2 the liquid is then rapidly discharged through the outlet 32 and the drain passage 33 together with such solid foreign matter as may be entrained by such liquid.

While the liquid is being discharged from the reservoir 2 the armature 42 together with the piston 43 is maintained in position by the magnet 39, whereas the float 44 is lowered alongside the piston 43 as the liquid level drops. As soon as the major part of the liquid has been discharged, the bottommost extremity of the bushing 45 abuts against the flange-shaped enlargement of the valve seat 27, thereby closing the passage from the reservoir 2 to the outlet 32. The reservoir 2, which is filled with compressed gas then communicates with the outlet 2 only through the clearance between the bushing 45 and the shell of the piston 43, the restrictor provided at the upper extremity 46 of the bushing 45 producing a comparatively high pressure drop and consequently a relatively low pressure on the underside of the piston 43 as compared with the upper side of the piston 43. As a result of this pressure difference the armature 42 is pulled away from the magnet 39 and lowered together with the piston 43 to its bottommost position as shown in the drawing, the piston 43 abutting against the closing member 34 and pressing the sealing member 36 tightly on to the outlet 32. The O-ring 48 provided between the closing member 34 and the piston 43 attenuates the impact and prevents the closing member 34 with the sealing member 36 from rebounding from the valve seat 27. Thus the drain valve 26 is automatically controlled as a function of the liquid level in the reservoir 2, both the opening and the closing of the drain valve 26 being performed with great speed, essentially complete evacuation of the reservoir 2 being assured without any compressed gas being lost.

The pressure difference between the opposite end faces of the piston 43 can be adjusted as required by the appropriate selection of the cross-sectional area of the piston and of the restrictor at the upper extremity 46 of the bushing 45. Experiments have shown the device to operate properly already at a pressure of about 15 p.s.i.g. only. In addition, the reduced diameter of the upper extremity 46 of the bushing 45 provides protection against the penetration of solid impurities in the gap between the piston 43 and the bushing 45 which is liable to impair the recprocable movement between the two elements. The stroke of the closing member 34 is adjustable by altering the depth of engagement of the valve seat 27 screwed into the reservoir 2, as well as by altering the distance between the armature 42 and the magnet 39 in the closed position of the drain valve, so as to adapt the device to various operating conditions.

The operation of the device can be further improved by relieving the closing member of pressure. In the embodiment illustrated this pressure relief is achieved by the provision of the control rod 37 presenting in the area where it emerges from the through pipe 11 into the open approximately the same diameter as the outlet 32 in the valve seat 27, the force required to actuate the closing member 34 being a function of the gas pressure prevailing inside the reservoir 2, so that a comparatively weak magnet will suffice for the purpose. The provision of the control rod 37 makes it possible for the draining device to be of simple design, as it permits positive guidance of the armature 42, of the piston 43 and of the float 44 at little expense. A further advantage resides in the manual operation of the drain valve, for example when because of low pressure prevailing in the compressed-gas system or following a temporary shutdown during which the system is pressureless, the armature is attracted by the magnet and thus the drain valve opened. In such an event the armature 42 can be pulled away from the magnet 37 and the closing of the drain valve 26 facilitated by depressing the control rod 37. Moreover, it is also possible to open the drain valve 26 at any time by means of the control rod 37 even if the system is under pressure, in order to sweep off such foreign matter as may have been deposited on the valve seat, or else the closing member 34 can be firmly pressed against the valve seat by means of the control rod 37 for the purpose of eliminating leakage.

The device according to the invention for the automatic draining of liquids can obviously also be used in compressed-gas systems under static conditions without essentially modifying the embodiment of the invention as hereabove described and as illustrated in the accompanying drawing, such as for example, for the separation of condensate from compressed-air containers. In that case, the storage reservoir 2 for the liquid is either directly connected to the compressed-air container or communicates with the same via a piping in which case the separator located in the housing 1 may be dispensed with. Within the scope of the invention the permanent magnet may be replaced by an electromagnet although this involves the need for a special power supply. Furthermore, the device can also be designed without manual control although this is most convenient, particularly where a magnet is used for the opening of the drain valve.

We claim:

1. A device for automatically draining of liquids from compressed gas systems comprising a storage reservoir for accumulating liquid separated from compressed gas, a drain opening in the bottom of the reservoir, drain valve seat means surrounding the drain opening, a drain valve element cooperating with the seat for opening and closing the drain opening, a valve stem reciprocably mounted in the reservoir connected to the drain valve element for operating said element, piston means slidably mounted on the valve stem, including an armature, a bushing slidably mounted on the piston means, the lower end of the bushing comprising valve means arranged to cooperate with valve seat means upstream of the drain valve element and seat, the arrangement being such that when the bushing is in its lowest position flow between the reservoir and the drain valve seat and element is prevented via the lower portion of the bushing and when raised from its lowest position flow is permitted, the upper portion of the bushing is constructed to form with the piston a restricted passageway between the reservoir and the drain valve head and seat, float means operatively connected to the bushing, interengaging means on the bushing and piston means for effecting upward movement of the piston means after a predetermined upward movement of the bushing, interengaging means on the piston means and the stem for effecting upward movement of the stem and consequently the drain valve element after a predetermined movement of the piston means, and a magnet mounted in the reservoir for cooperation with the armature, the magnet being arranged to attract and hold the piston means in its uppermost position upon a predetermined movement of the piston means and to maintain said piston in its uppermost position until the bushing falls to its lowermost position.

2. A device according to claim 1, in which a control rod is provided with the closing member of the drain valve connected with the control rod and the armature being slidably arranged on the control rod is provided with an integral stop for the armature, the control rod extending through the storage reservoir and protrudes into the open for the purpose of assuring manual operation of the drain valve and the control rod having approximately the same diameter in the area where it emerges into the open as the outlet in the valve seat of the drain valve.

3. A device according to claim 1, in which the valve seat of the drain valve is adjustably inserted in the storage reservoir in the direction of travel of the closing member.

References Cited
UNITED STATES PATENTS 2,726,732 12/1955 Faust _____ 137—195 X
2,999,509 9/1961 Hankison _____ 137—195

FOREIGN PATENTS 705,226 4/1941 Germany.

ALAN COHAN, *Primary Examiner.*